(12) United States Patent
Naito

(10) Patent No.: US 7,009,507 B2
(45) Date of Patent: *Mar. 7, 2006

(54) MOUNTING STRUCTURE OF TIRE MONITORING DEVICE

(75) Inventor: Mitsuru Naito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/686,602

(22) Filed: Oct. 17, 2003

(65) Prior Publication Data

US 2004/0084121 A1     May 6, 2004

(30) Foreign Application Priority Data

Oct. 28, 2002    (JP) .............................. 2002-312942

(51) Int. Cl.
  *B60C 23/00*     (2006.01)

(52) U.S. Cl. ....................... 340/447; 340/438; 340/442
(58) Field of Classification Search ........ 340/442–448; 73/146
See application file for complete search history.

(56) References Cited

U.S. PATENT DOCUMENTS

| | | | | |
|---|---|---|---|---|
| 4,160,234 A | * | 7/1979 | Karbo et al. ................. | 340/443 |
| 5,960,844 A | * | 10/1999 | Hamaya .................... | 152/152.1 |
| 6,016,102 A | * | 1/2000 | Fortune et al. ............. | 340/442 |
| 6,822,561 B1 | * | 11/2004 | Latarnik et al. ............. | 340/442 |
| 2003/0038716 A1 | * | 2/2003 | Piesinger .................... | 340/445 |
| 2003/0156024 A1 | * | 8/2003 | Beckley ...................... | 340/447 |
| 2003/0164799 A1 | * | 9/2003 | Nantz et al. ......... | 343/700 MS |
| 2004/0212486 A1 | * | 10/2004 | Dinello et al. .............. | 340/445 |

FOREIGN PATENT DOCUMENTS

| | | |
|---|---|---|
| JP | 10-297226 A1 | 11/1998 |
| JP | 2001-163020 A1 | 6/2001 |
| JP | 2001-519279 A1 | 10/2001 |
| WO | WO-02/13309 A1 | 2/2002 |

* cited by examiner

*Primary Examiner*—Benjamin C. Lee
*Assistant Examiner*—Son Tang

(57) ABSTRACT

Disclosed is a mounting structure of a tire monitoring device, in which the tire monitoring device is enabled to function as a warning device notifying a limit of run-flat traveling. When the tire monitoring device which transmits information of the inside of a tire by using radio waves is mounted on a support core member placed within the cavity of a pneumatic tire, a transmission antenna of the tire monitoring device is disposed on a load support surface in a peripheral portion of the support core member.

18 Claims, 2 Drawing Sheets

MOUNTING STRUCTURE OF TIRE MONITORING DEVICE

BACKGROUND OF THE INVENTION

The present invention relates to a structure of mounting a tire monitoring device on a support core member which enables run-flat traveling. More particularly, the present invention relates to a mounting structure of a tire monitoring device, in which the tire monitoring device is enabled to function as a warning device notifying a limit of run-flat traveling.

In response to demands in the market, numerous techniques have been proposed to allow a vehicle to run in an emergency for a certain distance even when a pneumatic tire is punctured while the vehicle is running. Some of these proposed techniques (such as the one disclosed in Published Japanese Translation of a PCT Application No. 2001-519279) enable run-flat traveling by inserting a hollow-structured support core member into the cavity of a pneumatic tire assembled to a rim, and supporting a flat tire by the support core member.

It is difficult for a driver to have an immediate grasp of puncture conditions in a tire/wheel assembly with a run-flat function. Therefore, a tire monitoring device typified by a pressure warning device is generally provided together with the run-flat function. The tire monitoring device is attached to a rim well or the like and transmits information of the inside of a tire detected by a sensor to a receiver on a vehicle through an antenna (refer to Published Japanese Translation of a PCT Application No. Hei 8-505939, for example).

Nevertheless, although the tire monitoring device effectively functions in assessing the puncture conditions, the information of the inside of the tire, such as air pressure and temperature, does not notify a limit of run-flat traveling. The run-flat traveling limit depends on the damage condition of the pneumatic tire due to friction with the support core member, or the damage condition of the support core member itself. Therefore, a development of a warning device which notifies the limit of run-flat traveling has been required.

SUMMARY OF THE INVENTION

An object of the present invention is to provide a mounting structure of a tire monitoring device, in which the tire monitoring device is enabled to function as a warning device notifying a limit of run-flat traveling.

The novel mounting structure of the tire monitoring device for achieving the above object is a structure of mounting a tire monitoring device on a support core member placed within the cavity of a pneumatic tire. The tire monitoring device transmits information of the inside of a tire by using radio waves. This mounting structure is characterized in that a transmission antenna of the tire monitoring device is disposed on a load support surface in a peripheral portion of the support core member.

Since the transmission antenna of the tire monitoring device is disposed on the load support surface in the peripheral portion of the support core member as described above, the tire monitoring device is enabled to function as a warning device which notifies a limit of run-flat traveling. Specifically, when the antenna is broken due to run-flat traveling, transmission from the tire monitoring device is lost. Therefore, the time point of the transmission loss can be taken as an index of the run-flat traveling limit.

It is preferable that the aforementioned antenna comprises a conductive antenna base and an insulating cover. In this case, based on a thickness or material of the cover, it is possible to arbitrarily adjust a distance for that a vehicle continues run-flat traveling until the antenna is broken.

In the present invention, once the tire monitoring device is attached to the support core member in advance, a work to attach the tire monitoring device on a rim well is no longer required. In addition, it is possible to avoid a disadvantage that the tire monitoring device falls from the well during tire-to-rim fit.

DETAILED DESCRIPTION OF THE PREFERRED EMBODIMENTS

Hereinafter, the present invention will be detailed with reference to the attached drawings.

Figure 1:
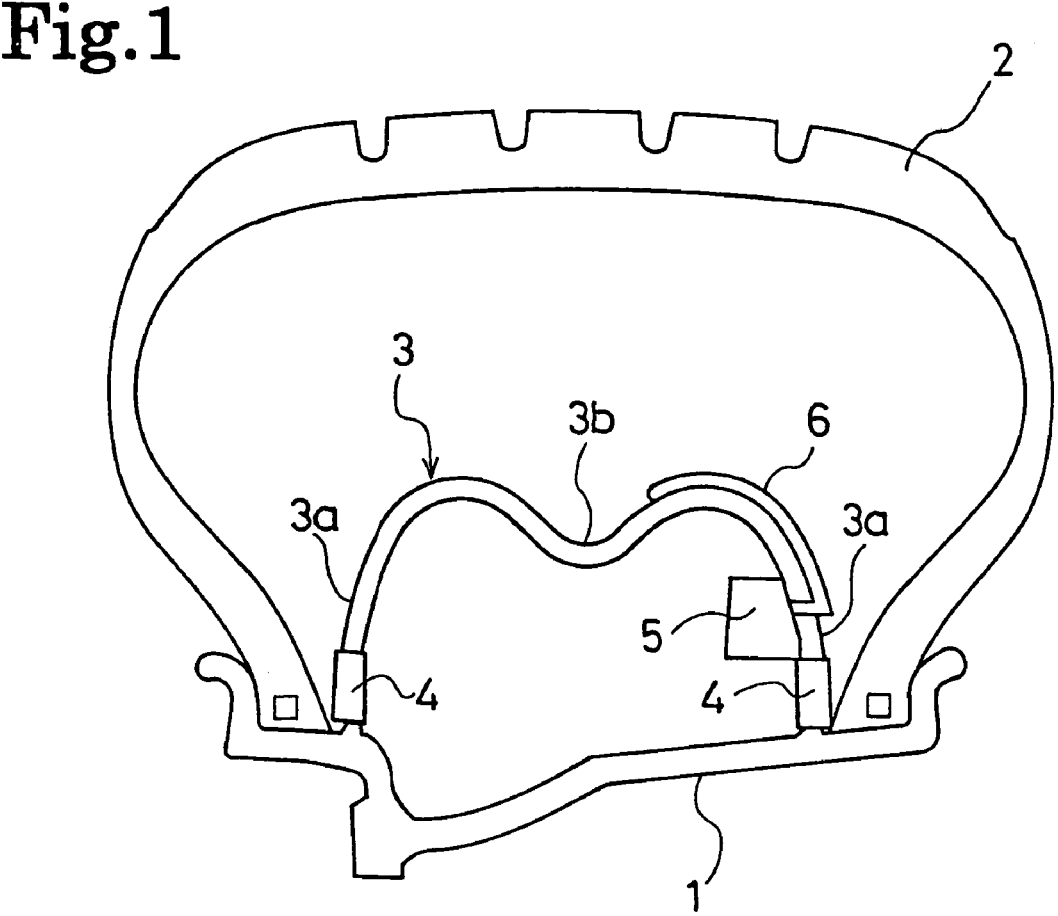
FIG. 1 is a cross-sectional view depicting a mounting structure of a tire monitoring device according to an embodiment of the present invention.

FIG. 1 shows a mounting structure of a tire monitoring device according to an embodiment of the present invention. The reference number 1 denotes a wheel rim, the reference number 2 denotes a pneumatic tire, and the reference number 3 denotes a run-flat support core member. Each of the rim 1, pneumatic tire 2, and support core member 3 is formed in a circular shape coaxially about the rotation axis of the wheel (not shown).

The support core member 3 is spaced apart from the inner wall of the pneumatic tire 2 under a normal driving condition, but supports the flattened pneumatic tire 2 from the inside of the tire when punctured. The support core member 3 has a continuous load support surface projecting toward the periphery of the tire to support the punctured tire, and has an open-leg-structure to form sidewalls 3a and 3a extending along the both sides of the load support surface. Additionally, the load support surface in a peripheral portion of the support core member 3 has a channel 3b hollowed in an outside-to-inside direction continuously formed along a core circumferential direction.

The support core member 3 is made of a rigid material since it has to support a vehicle weight through a flat pneumatic tire 2. The constituent material used for the support core member 3 is metal, resin, or the like. Examples for the metal are steel and aluminum, etc. The resin can be any of thermoplastic resin or thermosetting resin. Examples of the thermoplastic resin are nylon, polyester, polyethylene, polypropylene, polystyrene, polyphenylene sulfide, ABS, etc. Examples of the thermosetting resin are epoxy resin, unsaturated polyester resin, etc. The resin can be used as it is, but can also be used as fiber-reinforced resin made by blending reinforcing fibers therein.

Elastic rings 4 are attached to each of the sidewalls 3a and 3a of the support core member 3. These elastic rings 4 are adopted to support the support core member 3 while being abutted on bilateral rim seats. The elastic rings 4 not only mitigate impacts and vibrations that the support core member 3 receives from the flat pneumatic tire 2, but also prevent the support core member 3 from slipping on the rim seats so as to provide a stable support for the support core member 3.

A constituent material of the elastic rings 4 can be either rubber or resin, but rubber is particularly preferable. Examples of rubber types are natural rubber (NR), isoprene rubber (IR), styrene-butadiene rubber (SBR), butadiene rubber (BR), hydrogenated nitrile-butadiene rubber, hydrogenated stylene-butadiene rubber, ethylene propylene rubber (EPDM, EPM), isobutylene-isoprene rubber (IIR), acrylic rubber (ACM), chloroprene rubber (CR), silicone rubber and fluoro rubber.

The present invention is to provide a structure of mounting the tire monitoring device 5 on the support core member 3 placed within the cavity of the pneumatic tire 2 as mentioned earlier. This tire monitoring device 5 transmits information of the inside of the tire by using radio waves.

In FIG. 1, the tire monitoring device 5 is disposed on the inner side of the sidewall 3a of the support core member 3, and a transmission antenna 6 of the device is drawn to the outside of the support core member 3. The tire monitoring device 5 can be assembled to a hollow or opening portion formed in the sidewall 3a of the support core member 3, but has to be integrally fixed to the support core member 3 in any of the above cases. The antenna 6 drawn out to the outside of the support core member 3 is disposed to be extended to the load support surface in the peripheral portion of the support core member 3.

The tire monitoring device 5 incorporates various types of sensors and a transmitter. These sensors are for detecting information of the inside of the tire such as air pressure and temperature, and the transmitter is for transmitting the detection results of the sensors. To this transmitter, an antenna 6 is connected. The tire monitoring device 5 constantly detects the information of the inside of the pneumatic tire 2 and transmits the detection results to a receiver on a vehicle through the antenna 6.

Figure 2:
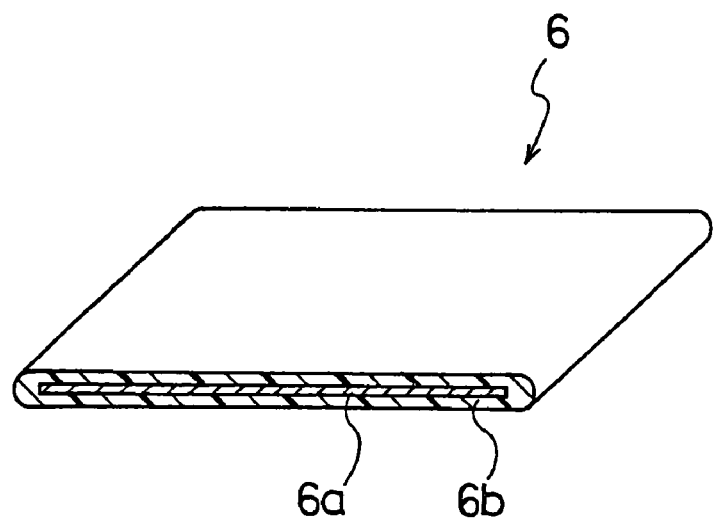
FIG. 2 is a perspective cross-sectional view depicting an example of a film-shaped antenna.

The antenna 6 can be a film-shaped antenna as illustrated in FIG. 2. In FIG. 2, the antenna 6 comprises a patterned conductive antenna base 6a and an insulating cover 6b, which are formed in a film shape. For the cover 6b, resin or rubber can be used. If the antenna 6 configured in this way is stuck to the outer surface of the support core member 3, the antenna 6 located outside of the support core member 3 will not interfere with a work such as to assemble the pneumatic tire 2 and the support core member 3.

In the aforementioned mounting structure of the tire monitoring device, the antenna 6 is disposed on the load support surface in the peripheral portion of the support core member 3. Therefore, the tire monitoring device 5 not only provides information of the inside of the tire under a normal driving condition, but also functions as a warning device which notifies a run-flat traveling limit. Specifically, if the antenna 6 contacts the pneumatic tire 2 on and off during run-flat traveling, the cover 6b serving as a protecting layer of the antenna 6 is gradually broken, and thereby the antenna 6 ultimately stops functioning. Then, transmission of the information of the inside of the tire from the tire monitoring device 5 is lost, and thus the time point of the transmission loss can be taken as an index of the run-flat traveling limit. In this case, it is possible to arbitrarily adjust a distance for that a vehicle continues run-flat traveling until the antenna 6 is broken based on the thickness or material of the cover 6b of the antenna 6.

Moreover, in the foregoing mounting structure of the tire monitoring device, the tire monitoring device 5 is attached to the support core member 3 in advance. Therefore, a work to attach the tire monitoring device 5 to the well of the rim 1 is no longer required. In addition, it is possible to avoid a disadvantage that the tire monitoring device 5 falls from the well during tire-to-rim fit.

Figure 3:
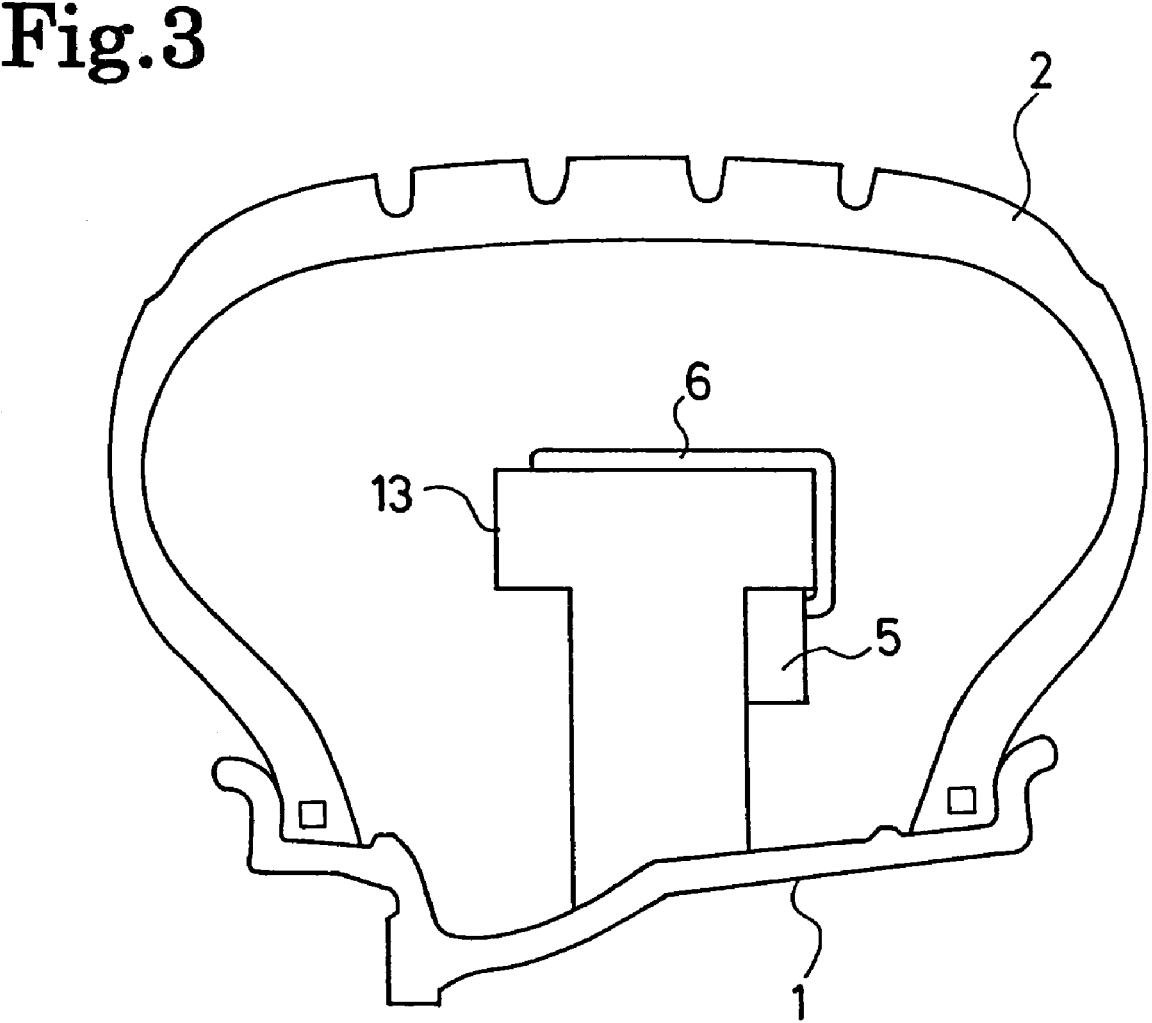
FIG. 3 is a cross-sectional view depicting a mounting structure of a tire monitoring device according to another embodiment of the present invention.

FIG. 3 shows a mounting structure of a tire monitoring device according to another embodiment of the present invention. The only difference between this embodiment and the preceding embodiment is the shape of the support core member.

As illustrated in FIG. 3, a support core member 13 placed within the cavity of a pneumatic tire 2 is spaced apart from the inner wall of the pneumatic tire 2 during normal traveling, but supports the flattened pneumatic tire 2 from the inside of the tire when punctured. This support core member 13 has a T-shape cross section and is structured to have a continuous load support surface projecting toward the periphery of the tire to support the punctured tire. Meanwhile, a tire monitoring device 5 is disposed on the side of the support core member 13, and a transmission antenna 6 of the device is disposed on the load support surface in a peripheral portion of the support core member 13.

In the above-mentioned mounting structure of the tire monitoring device, the antenna 6 is disposed on the load support surface in the peripheral portion of the support core member 13. Therefore, similarly to the preceding embodiment, the tire monitoring device 5 is enabled to function as a warning device which notifies a run-flat traveling limit.

In the present invention, the shape and material of the support core member is not particularly limited. Accordingly, it is also possible to apply this novel mounting structure of the tire monitoring device to various support core members apart from the foregoing embodiments, as long as they act as run-flat support core members.

EXAMPLE

A tire/wheel assembly including a pneumatic tire with a tire size of 205/55R16 89V and a wheel with a rim size of 16×6 1/2JJ was prepared. In this tire/wheel assembly, a hollow-structured support core member made of a 1.0 mm-thick steel plate was placed within the cavity of the pneumatic tire. At the same time, as shown in FIG. 1, a tire monitoring device was disposed on the sidewall of the support core member, and a transmission antenna of the device was disposed on a load support surface in the peripheral portion of the support core member.

A durability test of run-flat traveling was conducted using the above tire/wheel assembly. During this durability test, radio waves transmitted from the tire monitoring device through the antenna were received outside the tire. In the durability test, the tire/wheel assembly was fitted to a front right wheel of a front engine/rear drive (FR) vehicle of a 2.5 liter displacement. Inner pressure of the tire was set to 0 kPa (200 kPa for the rest of the tires), and the vehicle was driven counterclockwise at 90 km/h around a circular track. Then, a driving distance was measured until the vehicle became incapable of being driven.

As a result, the radio waves from the tire monitoring device were stopped being received at the point when the vehicle is driven for 90% of the run-flat traveling distance. In this way, transmission from the tire monitoring device is lost as run-flat traveling continues, and thereby the time point of the transmission loss can be taken as an index of run-flat traveling limit.

According to the present invention, a tire monitoring device which transmits information of the inside of a tire by using radio waves is mounted on a support core member placed within the cavity of a pneumatic tire, in which a transmission antenna of the tire monitoring device is disposed on a load support surface in a peripheral portion of the support core member. Hence, the tire monitoring device is enabled to function as a warning device which notifies a run-flat traveling limit.

The preferred embodiments of the present invention have been hitherto described in detail. It should be understood that various modifications, substitutions and replacements can be made without departing from the spirit and scope of the present invention as defined by the appended claims.

What is claimed is:

1. A mounting structure of a tire monitoring device in which the tire monitoring device transmitting information of an inside of a tire by using radio waves is mounted on a run-flat support core member placed within a cavity of a pneumatic tire,
   wherein a transmission antenna of the tire monitoring device is disposed on a load support surface in a peripheral portion of the support core member.

2. The mounting structure of a tire monitoring device according to claim 1, wherein the antenna comprises a conductive antenna base and an insulating cover.

3. The mounting structure of a tire monitoring device according to claim 1, wherein the antenna is formed in a film shape.

4. The mounting structure of a tire monitoring device according to claim 2, wherein the antenna is formed in a film shape.

5. The mounting structure of a tire monitoring device according to claim 1, wherein the support core member is spaced apart from the inner wall of the pneumatic tire during normal traveling.

6. A mounting structure of a tire monitoring device comprising:
   a run-flat support core member disposed within the cavity of a pneumatic tire; and
   a transmission antenna of the tire monitoring device disposed on a load support surface of said support core member.

7. The mounting structure of a tire monitoring device according to claim 6, wherein said transmission antenna is formed in a film shape.

8. The mounting structure of a tire monitoring device according to claim 6, wherein said transmission antenna includes a conductive antenna base and an insulating cover.

9. The mounting structure of a tire monitoring device according to claim 6, wherein said transmission antenna is disposed in a peripheral portion of said support core member.

10. The mounting structure of a tire monitoring device according to claim 6, wherein said load support surface is the outer surface of said support core member.

11. The mounting structure of a tire monitoring device according to claim 6, wherein said load support surface projects toward the periphery of said pneumatic tire.

12. The mounting structure of a tire monitoring device according to claim 6, wherein said support core member structurally adapted to be spaced apart from the inner wall of said pneumatic tire during normal traveling.

13. The mounting structure of a tire monitoring device according to claim 6, wherein said support core member is structurally adapted to support the flattened pneumatic tire from the inside of said flattened pneumatic tire when punctured.

14. The mounting structure of a tire monitoring device according to claim 6, wherein said support core member has a T-shape cross section.

15. The mounting structure of a tire monitoring device according to claim 6, wherein said tire monitoring device is mounted on said support core member.

16. The mounting structure of a tire monitoring device according to claim 6, wherein said tire monitoring device is disposed on the inner side of the sidewall of said support core member.

17. The mounting structure of a tire monitoring device according to claim 6, wherein said tire monitoring device transmits information from within said cavity of said pneumatic tire.

18. The mounting structure of a tire monitoring device according to claim 17, wherein said tire monitoring device uses radio waves to transmit said information.

* * * * *